(12) United States Patent
Wicks et al.

(10) Patent No.: US 11,615,537 B2
(45) Date of Patent: Mar. 28, 2023

(54) METHODS AND APPARATUS FOR MOTION ESTIMATION BASED ON REGION DISCONTINUITY

(71) Applicant: QUALCOMM Incorporated, San Diego, CA (US)

(72) Inventors: Jonathan Wicks, Louisville, CO (US); Samuel Benjamin Holmes, Sterling, MA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 17/087,528

(22) Filed: Nov. 2, 2020

(65) Prior Publication Data

US 2022/0138961 A1 May 5, 2022

(51) Int. Cl.
*G06T 7/215* (2017.01)
*G06T 7/246* (2017.01)
*G06T 15/00* (2011.01)
*G06T 19/00* (2011.01)

(52) U.S. Cl.
CPC .............. *G06T 7/215* (2017.01); *G06T 7/246* (2017.01); *G06T 15/005* (2013.01); *G06T 19/006* (2013.01)

(58) Field of Classification Search
CPC ............................ G06T 15/005; G06T 19/006
USPC .......................................................... 382/107
See application file for complete search history.

(56) References Cited

U.S. PATENT DOCUMENTS

| | | | |
|---|---|---|---|
| 6,434,196 B1 * | 8/2002 | Sethuraman | H04N 19/114 375/E7.22 |
| 10,255,683 B1 * | 4/2019 | Gopal | G06V 20/52 |
| 2009/0237516 A1 | 9/2009 | Jayachandra et al. | |
| 2014/0098999 A1 * | 4/2014 | U S | G06T 7/215 382/107 |
| 2014/0226865 A1 * | 8/2014 | Li | G06V 10/25 382/107 |
| 2014/0327820 A1 * | 11/2014 | Iketani | H04N 5/145 348/452 |
| 2020/0186817 A1 | 6/2020 | Holmes et al. | |
| 2020/0380700 A1 * | 12/2020 | Holmes | G06T 3/20 |

FOREIGN PATENT DOCUMENTS

CN    102123235 A    7/2011

OTHER PUBLICATIONS

International Search Report and Written Opinion—PCT/US2021/053649—ISA/EPO—dated Feb. 2, 2022.

\* cited by examiner

*Primary Examiner* — Gabriel I Garcia
(74) *Attorney, Agent, or Firm* — Procopio, Cory, Hargreaves & Savitch LLP

(57) ABSTRACT

The present disclosure relates to methods and devices for image or frame processing including an apparatus, e.g., a GPU. In some aspects, the apparatus may identify a discontinuity between at least one first region of a first frame and at least one second region of a second frame, the at least one first region corresponding to the at least one second region. The apparatus may also determine whether the discontinuity between the at least one first region and the at least one second region is greater than or equal to a motion estimation threshold. The apparatus may also skip a motion estimation for the at least one first region and the at least one second region when the discontinuity between the at least one first region and the at least one second region is greater than or equal to the motion estimation threshold.

43 Claims, 8 Drawing Sheets

METHODS AND APPARATUS FOR MOTION ESTIMATION BASED ON REGION DISCONTINUITY

TECHNICAL FIELD

The present disclosure relates generally to processing systems and, more particularly, to one or more techniques for image or frame processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a GPU, a CPU, an image processor, a frame processor, a display processing unit (DPU), and/or any apparatus that can perform image or frame processing. The apparatus may receive a second frame after a first frame is received. The apparatus may also compare the at least one first region of the first frame to the at least one second region of the second frame. The apparatus may also identify a discontinuity between at least one first region of a first frame and at least one second region of a second frame, the at least one first region corresponding to the at least one second region, the first frame including a plurality of first regions and the second frame including a plurality of second regions, the first frame and the second frame associated with a plurality of frames. Additionally, the apparatus may determine whether the discontinuity between the at least one first region and the at least one second region is greater than or equal to a motion estimation threshold. The apparatus may also skip a motion estimation for the at least one first region and the at least one second region when the discontinuity between the at least one first region and the at least one second region is greater than or equal to the motion estimation threshold. Moreover, the apparatus may perform a motion estimation for the at least one first region and the at least one second region when the discontinuity between the at least one first region and the at least one second region is less than the motion estimation threshold. The apparatus may also configure a third frame based on the performed motion estimation, where the configured third frame may be associated with a frame extrapolation process.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
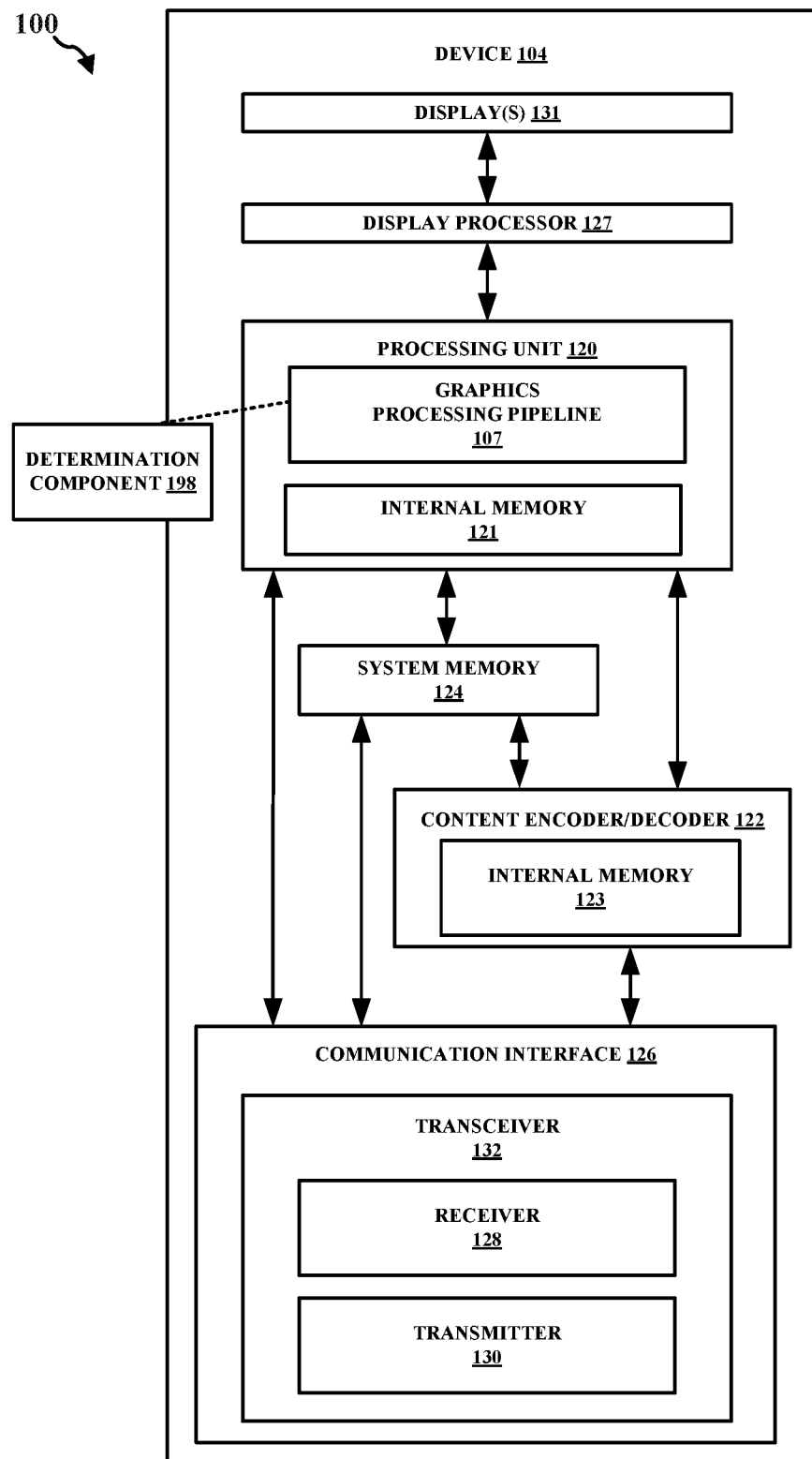
FIG. 1 is a block diagram that illustrates an example content generation system in accordance with one or more techniques of this disclosure.

Extended reality (XR), augmented reality (AR), or virtual reality (VR) applications may be utilized with certain devices, e.g., mobile devices or smartphones, which may be under demanding constraints for power and performance efficiency. In order to alleviate these constraints, motion estimation may be performed on previously rendered content and/or used to extrapolate frames. Motion estimation may work well at times, however, the content may be discontinuous when transitioning between frames, such as on a frame-by-frame basis. In these instances, performing motion estimation may result in inaccurate data, e.g., inaccurate or spurious motion estimation data, based on the discontinuous content between frames. This inaccurate data may result in a poor or incomplete frame extrapolation the based on the motion estimation. In some instances, motion estimation and/or frame extrapolation that are applied across these discontinuous frames may produce random or incorrect motion vectors. Moreover, these random or incorrect motion vectors that are produced from discontinuous frames may result in strong, unintended distortions in the extrapolated frame or a certain portion of the extrapolated frame. If there is discontinuity between frames, e.g., based on the content or brightness of the frames, then inaccurate motion estimation may be produced. Aspects of the present disclosure may skip or bypass performing motion estimation for certain frames or regions of frames in order to avoid incorrect motion vectors and/or unintended distortions. For instance, aspects of the present disclosure may identify a discontinuity or difference between certain frames or regions of frames. Additionally, aspects of the present disclosure may determine if a discontinuity or difference between certain frames or regions of frames is above a threshold, and then skip or bypass performing motion estimation if the discontinuity or difference is above the threshold.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to receive a second frame after a first frame is received. The determination component 198 can also be configured to compare the at least one first region of the first frame to the at least one second region of the second frame. The determination component 198 can also be configured to identify a discontinuity between at least one first region of a first frame and at least one second region of a second frame, the at least one first region corresponding to the at least one second region, the first frame including a plurality of first regions and the second frame including a plurality of second regions, the first frame and the second frame associated with a plurality of frames. The determination component 198 can also be configured to determine whether the discontinuity between the at least one first region and the at least one second region is greater than or equal to a motion estimation threshold. The determination component 198 can also be configured to skip a motion estimation for the at least one first region and the at least one second region when the discontinuity between the at least one first region and the at least one second region is greater than or equal to the motion estimation threshold. The determination component 198 can also be configured to perform a motion estimation for the at least one first region and the at least one second region when the discontinuity between the at least one first region and the at least one second region is less than the motion estimation threshold. The determination component 198 can also be configured to configure a third frame based on the performed motion estimation, where the configured third frame may be associated with a frame extrapolation process.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
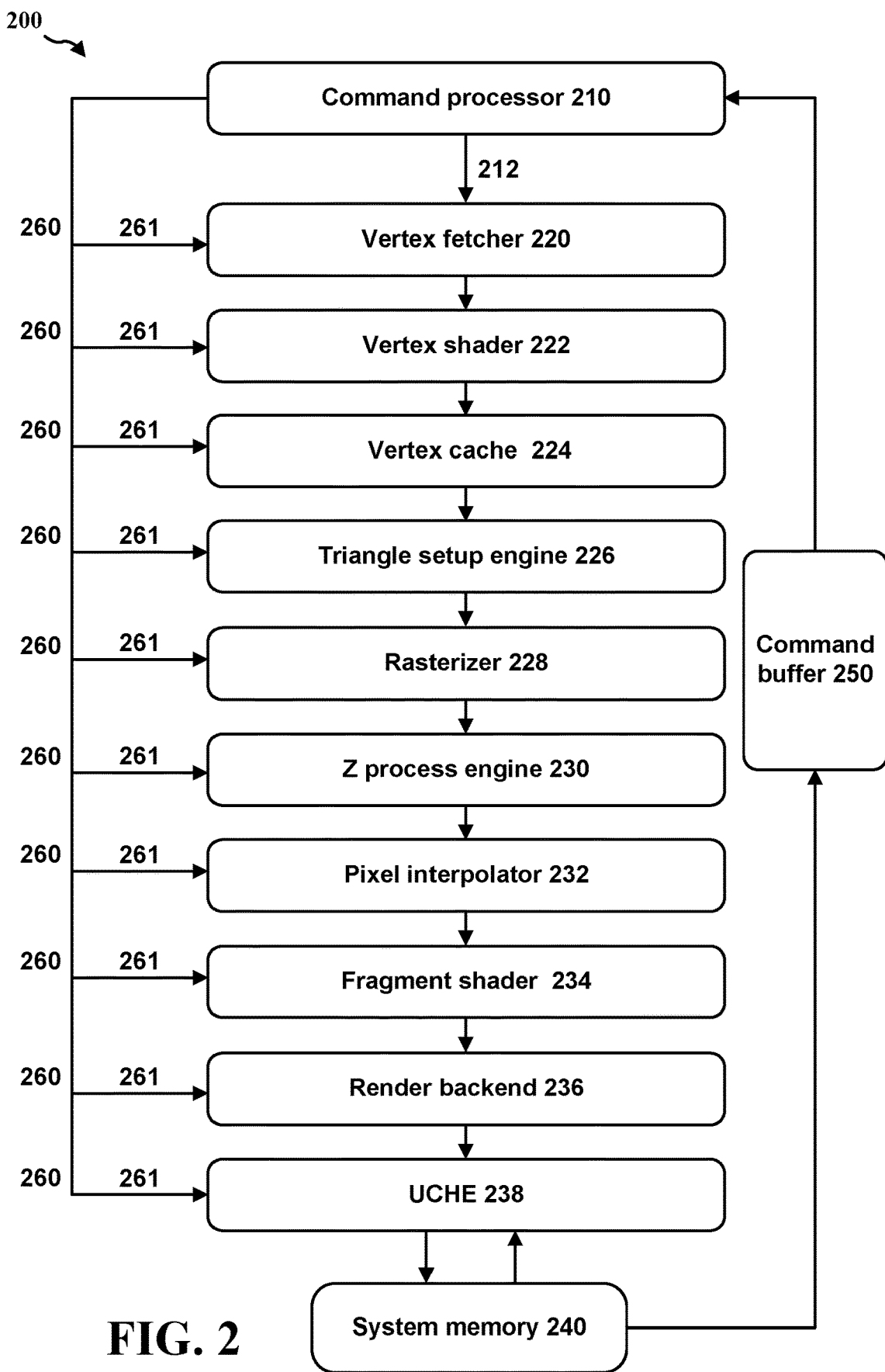
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information for each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
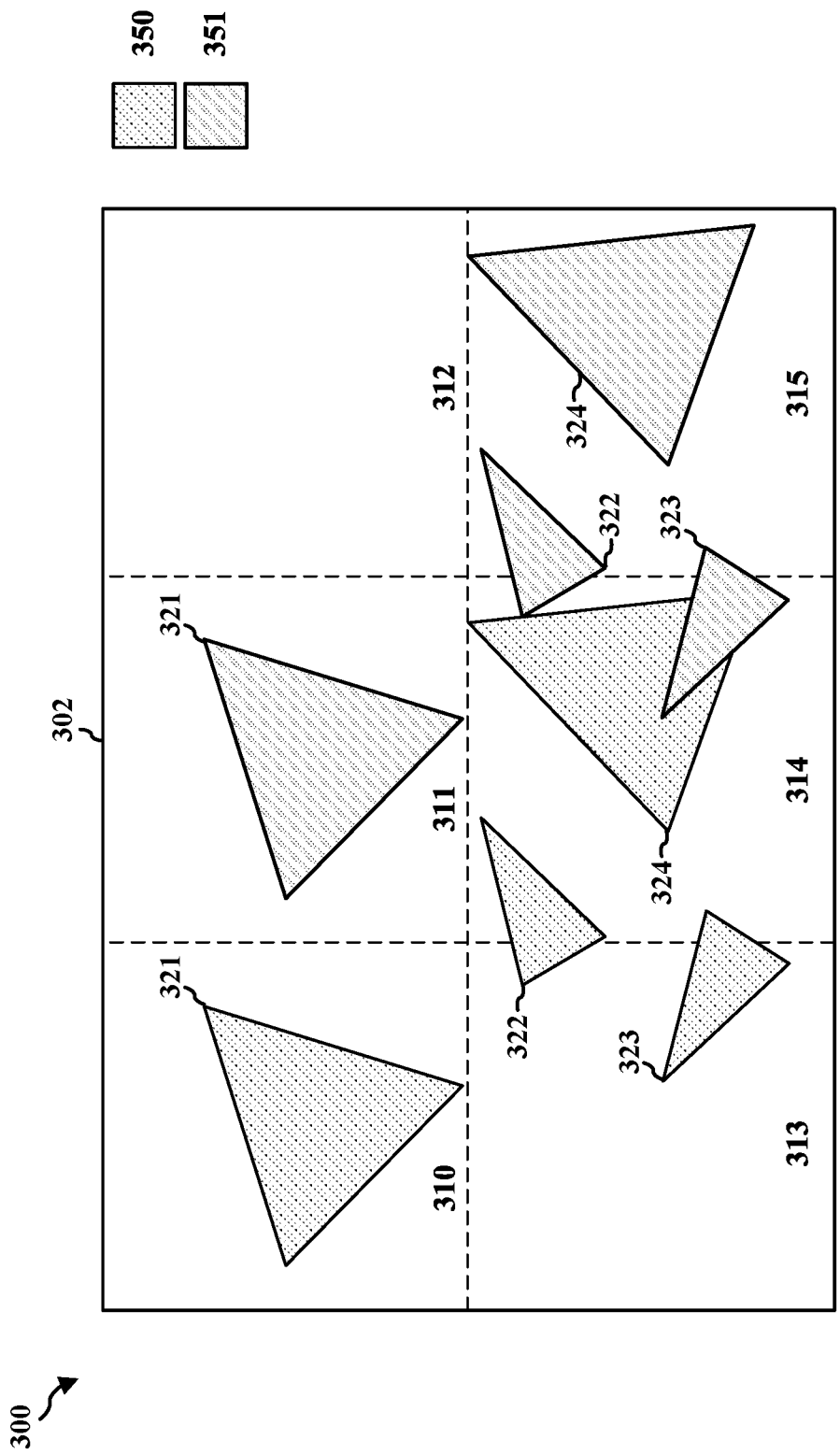
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

Some aspects of image or frame processing can be associated with different types of applications, e.g., extended reality (XR), augmented reality (AR), or virtual reality (VR) applications. In some aspects, XR, AR, or VR applications or systems may be utilized with certain devices, e.g., mobile devices or smartphones, which may be under demanding constraints for power and performance efficiency. In order to alleviate these constraints, motion estimation may be performed on previously rendered content and/or used to extrapolate frames. For example, instead of rendering a frame, previously rendered frames can be used to estimate motion for the frame. In turn, motion estimation may allow rendering operations to run at a reduced frame rate. Frame extrapolation may also be utilized for streaming remote game rendering, such as to cover for intermittent network issues and/or bandwidth constraints.

Motion estimation may work well at times, however, the content may be discontinuous when transitioning between frames, such as on a frame-by-frame basis. For instance, certain actions within applications, e.g., when a user teleports in a gaming application, may result in discontinuous content between frames. In these instances, performing motion estimation may result in inaccurate data, e.g., inaccurate or spurious motion estimation data, based on the discontinuous content between frames. This inaccurate data may result in a poor or incomplete frame extrapolation the based on the motion estimation.

Certain types of content may result in the aforementioned discontinuities between frames. For example, user interface (UI) elements or menus, such as those that pop open or change content in a single frame, may be discontinuous for successive frames. Also, certain camera transitions that occur in a single frame, such as a common teleport XR locomotion mechanic, may be discontinuous frame-to-frame. Further, snap turns that rotate a camera a large amount in a single frame may be discontinuous for successive frames. Effects which add immediate transparent overlays or changes in brightness may also be discontinuous frame-to-frame. Additionally, rapid controller movements may be discontinuous for successive frames.

In some instances, motion estimation and/or frame extrapolation that are applied across these discontinuous frames may produce random or incorrect motion vectors. As indicated previously, the resulting discontinuity in content may be across the entire frame or within a certain region of the frame. Moreover, these random or incorrect motion vectors that are produced from discontinuous frames may result in strong, unintended distortions in the extrapolated frame or a certain portion of the extrapolated frame.

As indicated above, motion estimation may specify a continuity between frames or certain regions of frames. If there is discontinuity between frames, e.g., based on the content or brightness of the frames, then inaccurate motion estimation may be produced. Based on the above, it may be beneficial to skip or bypass motion estimation for certain frames or regions of frames in order to avoid incorrect motion vectors and/or unintended distortions. For instance, it may be beneficial to skip or bypass performing motion estimation if the discontinuity or difference between certain frames or regions of frames is identified.

Aspects of the present disclosure may skip or bypass performing motion estimation for certain frames or regions of frames in order to avoid incorrect motion vectors and/or unintended distortions. For instance, aspects of the present disclosure may identify a discontinuity or difference between certain frames or regions of frames. Additionally, aspects of the present disclosure may determine if a discontinuity or difference between certain frames or regions of frames is above a threshold, and then skip or bypass performing motion estimation if the discontinuity or difference is above a threshold.

As indicated above, motion estimation may produce a number of estimated vectors, even when provided discontinuous content, which may result in regions of low quality estimation. Some aspects of the present disclosure may utilize certain components, e.g., a lightweight hash, in order to perform an analysis to identify when content has diverged between frames or regions of frames. For example, frames may be divided into regions, with a hash analysis being performed per region of the frame. The lightweight hash of the present disclosure may compare the contents of each frame region in order to determine or identify a discontinuity between frame regions.

In some instances, if there is too much of a change or discontinuity between regions of frames, a threshold may be triggered that causes motion estimation for a region or frame to be skipped or bypassed. Accordingly, the results for each frame region may be used to skip vector generation or inform a confidence metric for that particular region. So aspects of the present disclosure may determine or identify discontinuities between frames or frame regions that may not be able to handle motion estimation, and then skip or bypass motion estimation for these frames or frame regions. Moreover, the present disclosure may determine or identify those discontinuities between frames or frame regions that may be able to handle motion estimation. In addition, some aspects of the present disclosure may be utilized with certain types of rendering, e.g., bin rendering or tiled rendering.

Figure 4B:
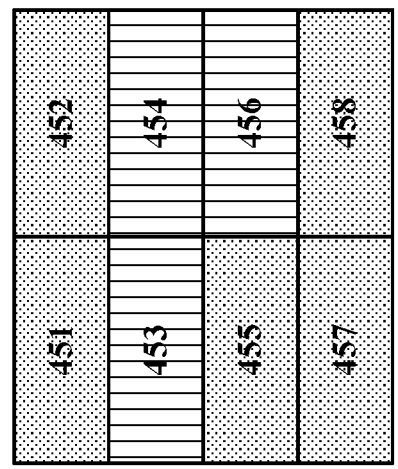
FIGS. 4A and 4B illustrate example frames in accordance with one or more techniques of this disclosure.
Figure 4A:
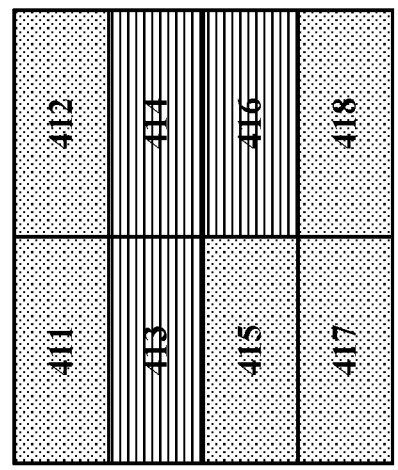

FIGS. 4A and 4B illustrate first frame 400 and second frame 450, respectively. More specifically, FIG. 4A depicts first frame 400 including regions 411-418 and FIG. 4B depicts second frame 450 including regions 451-458. As shown in FIGS. 4A and 4B, first frame 400 and second frame 450 include multiple regions with different patterns. Similar patterns between corresponding frame regions indicate correlated or continuous content. Likewise, dissimilar patterns between corresponding frame regions indicate uncorrelated or discontinuous content. For instance, regions 411, 412, 415, 417, 418 in first frame 400 and regions 451, 452, 455, 457, 458 in second frame 450 each include a dotted pattern. Accordingly, the corresponding frame regions, e.g., regions 411/451, 412/452, 415/455, 417/457, and 418/458, include correlated or continuous content. Moreover, regions 413, 414, 416 in first frame 400 include a horizontal pattern, while regions 453, 454, 456 in second frame 450 include a vertical pattern. As such, the corresponding frame regions, e.g., regions 413/453, 414/454, and 416/456, include uncorrelated or discontinuous content.

In some aspects of the present disclosure, the detection of scene changes and the modification of the resulting motion estimation workload may be performed in-line, i.e., at the same time, with the motion estimation process. In some instances, the motion estimation algorithm of the present disclosure may utilize an image pyramid or a partial image pyramid. This image pyramid may be a hierarchy including a sequence of downscaled versions of the input image. Aspects of the present disclosure may extend the image pyramid to lower resolution levels compared to typical motion estimation. As such, the present disclosure may extend the image pyramid to certain resolutions, e.g., 8×8 pixels, in order to perform the aforementioned hash analysis per frame region. This hash analysis may result in a hash value for certain discontinuity or delta calculations, which may be compared to a motion estimation threshold.

As mentioned above, aspects of the present disclosure may detect discontinuities in successive frame content, i.e., frame-to-frame content, using an image hash function. This image hash function of the present disclosure may be performed on a lower resolution image pyramid level, which may be segmented into frame regions. In some aspects, when a region is detected to have a discontinuity, a hash function shader pass may modify a mask that controls which regions of the surface may have motion estimation applied. Once the present disclosure has identified the frame regions on which motion estimation is to be performed, a mask or masked motion estimation, may be utilized to determine whether a search is to be performed at a motion vector level. So once the regions of the frame are identified for motion estimation, this information may be provided to a mask or masked motion estimation. If each region or a portion of the regions are identified or determined to include discontinuous content, the present disclosure may bypass the frame extrapolation.

In some aspects, the identification or determination of discontinuous content of a frame or frame region may be performed by certain component, e.g., a GPU or CPU. For instance, aspects of the present disclosure may be performed by a GPU during a frame rendering process of an AR/XR/VR application. For example, aspects of the present disclosure may be performed by a GPU or CPU on a host device or a client device, such as a mobile device or smartphone.

The aforementioned discontinuities between frame regions may be associated with a difference in content, brightness, and/or noise. Additionally, the aforementioned discontinuities between frame regions may correspond to a transparent overlay between the regions. For example, a user may be viewing an object and activate a UI, which may result in a transparent overlay on a subsequent frame compared to a previous frame. In some aspects, the present disclosure may consider two frames when performing the discontinuity identification. In other aspects, the present disclosure may consider more than two frames, e.g., three (3), four (4), eight (8), sixteen (16) frames, etc., when performing the discontinuity identification.

Figure 5:
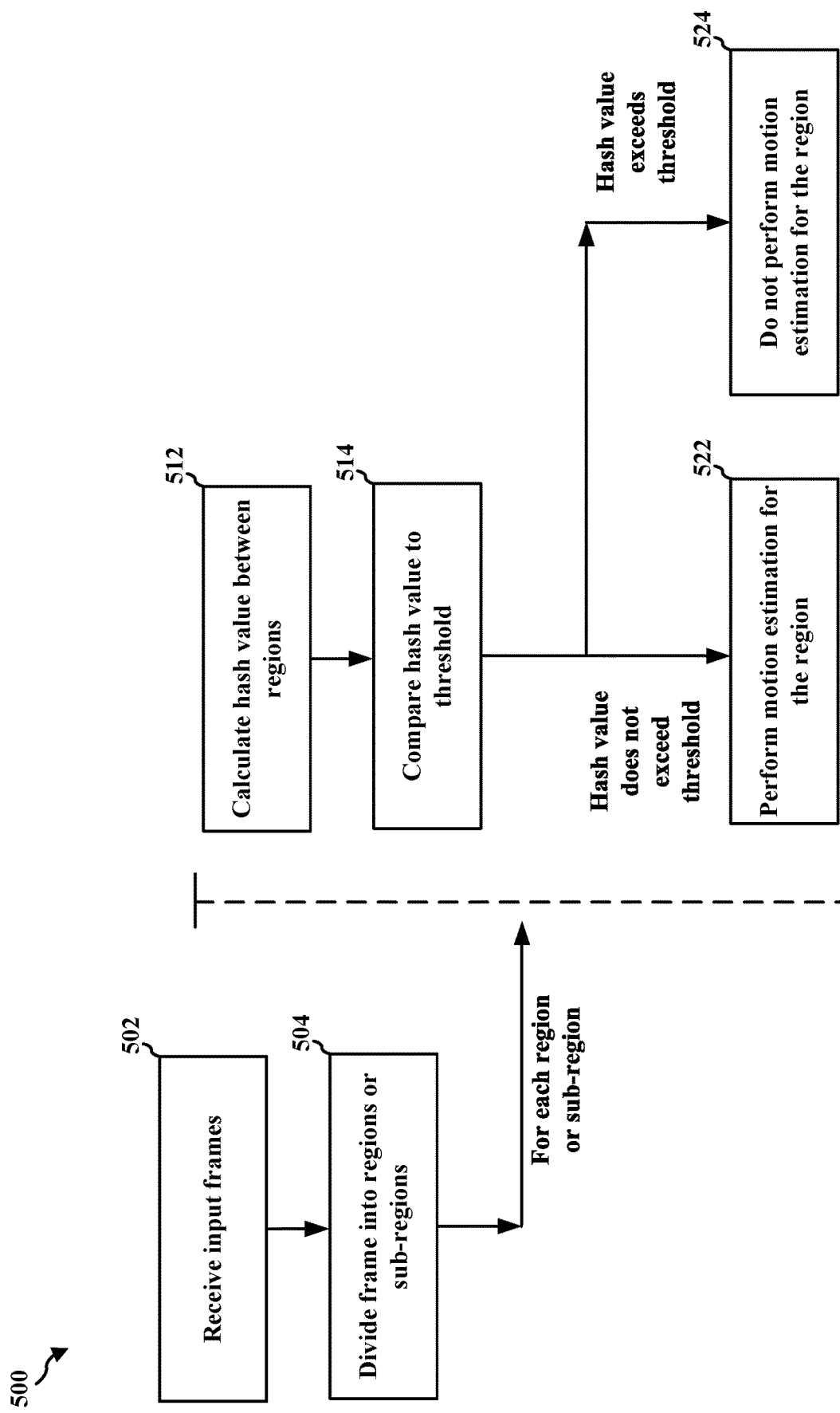
FIG. 5 illustrates an example diagram of image processing in accordance with one or more techniques of this disclosure.

FIG. 5 illustrates diagram 500 of image or frame processing according to the present disclosure. As shown in FIG. 5, at 502, aspects of the present disclosure may receive a number of input frames. At 504, aspects of the present disclosure may divide each frame into regions or sub-regions. For each region or sub-region of a frame, the present disclosure may perform steps 512/514/522/524. At 512, aspects of the present disclosure may calculate a hash value between regions or sub-regions of successive frames. At 514, aspects of the present disclosure may compare the hash value to a threshold, e.g., a motion estimation threshold. If the hash value does not exceed the threshold, at 522, aspects of the present disclosure may perform motion estimation for the region or sub-region of the frames. If the hash value exceeds the threshold, at 524, aspects of the present disclosure may not perform motion estimation for the region or sub-region.

Figure 6:
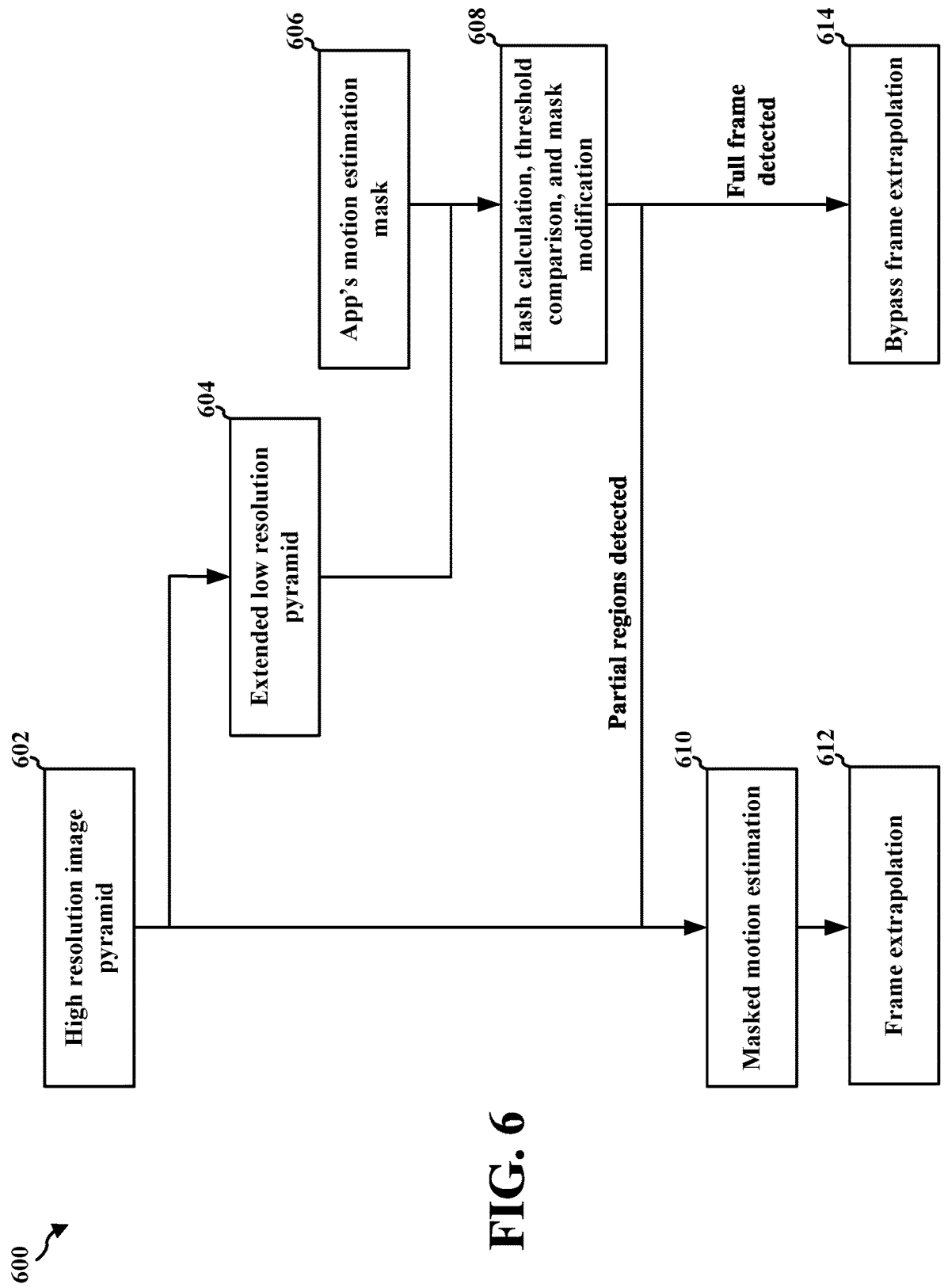
FIG. 6 illustrates an example diagram of image processing in accordance with one or more techniques of this disclosure.

FIG. 6 illustrates diagram 600 of image or frame processing according to the present disclosure. As shown in FIG. 6, at 602, aspects of the present disclosure may utilize a high resolution image pyramid. At 604, aspects of the present disclosure may extend the high resolution image pyramid to a low resolution pyramid. At 606, aspects of the present disclosure may utilize a mask, e.g., an application's motion estimation mask. Based on 604 and 606, at 608, aspects of the present disclosure may perform a hash calculation, a threshold comparison, and/or a mask modification. Based on partial frame regions being detected at 602 and/or 608, at 610, aspects of the present disclosure may perform a masked motion estimation. Additionally, at 612, aspects of the present disclosure may perform a frame extrapolation. Based on a full frame being detected at 602 and/or 608, at 614, aspects of the present disclosure may skip or bypass frame extrapolation.

As indicated previously, in certain aspects, e.g., when a user teleports incorrect motion estimation, the absence of scene change detection may result in a high distortion on a subsequent frame. In contrast, in aspects of the present disclosure including scene change detection, low quality motion vectors for successive frames may be identified and removed. This removal of low quality motion vectors may result in a clean extrapolated frame and/or increased accuracy.

Figure 7:
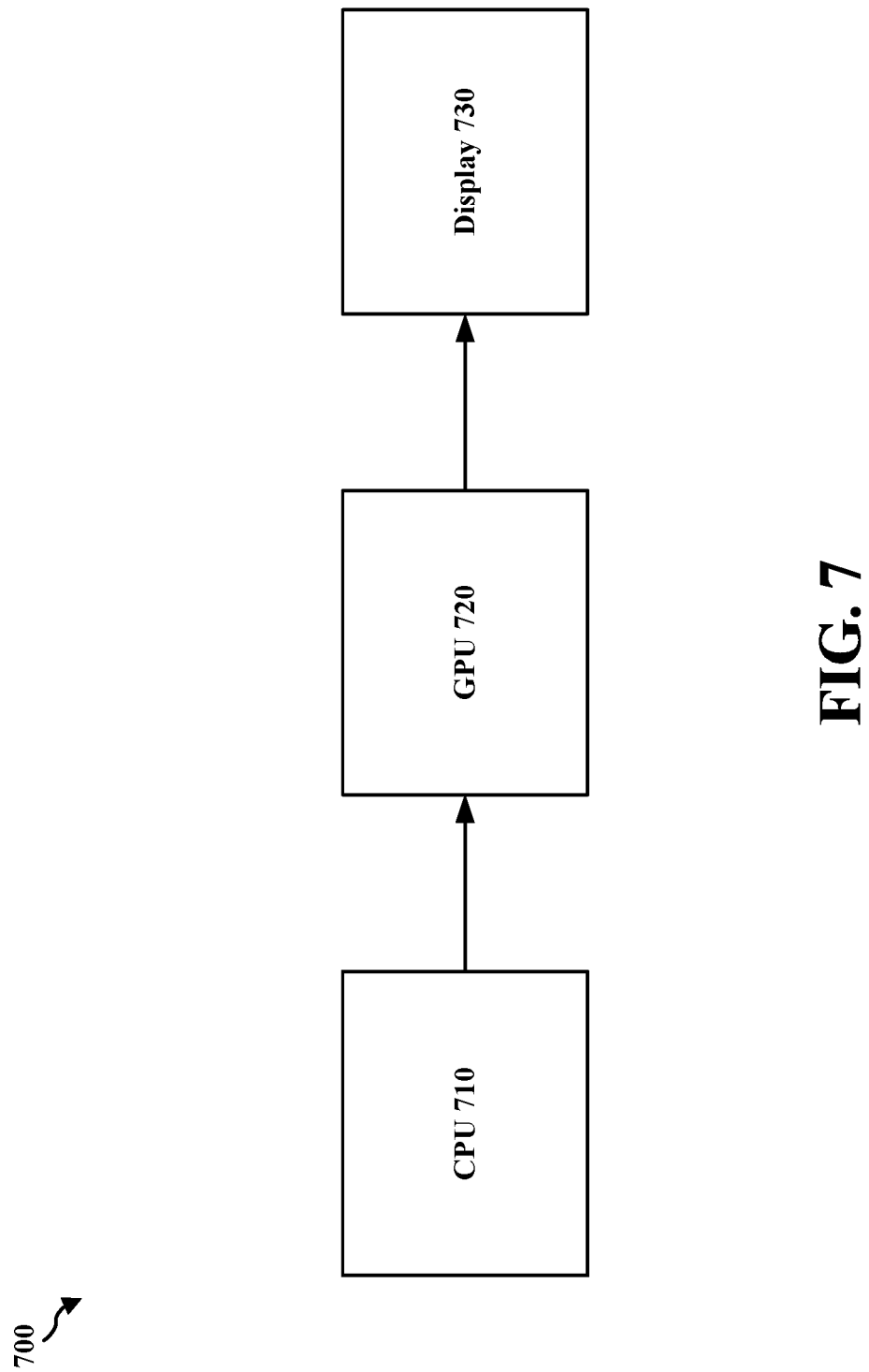
FIG. 7 illustrates an example diagram of image processing components in accordance with one or more techniques of this disclosure.

FIG. 7 illustrates diagram 700 of image, frame, or graphics processing components. As shown in FIG. 7, diagram 700 includes central processing unit (CPU) 710, graphics processing unit (GPU) 720, and display 730 including a display processing unit (DPU). Diagram 700 depicts a number of components that may be utilized by client devices or host devices, e.g., mobile devices or smartphones, in XR, AR, or VR applications. For instance, CPU 710, GPU 720, and display 730 may be utilized to perform the skipping motion estimation techniques described herein.

FIGS. 4A-7 illustrate examples of the aforementioned methods and processes for skipping motion estimation. As shown in FIGS. 4A-7, in aspects of the present disclosure, CPUs and GPUs herein, e.g., CPU 710 and/or GPU 720, may perform a number of different steps or processes for skipping motion estimation in order to increase the accuracy of image processing. For instance, CPUs and GPUs herein may skip motion estimation for a first frame region and a second frame region when a discontinuity between the first region and the second region is greater than or equal to a motion estimation threshold.

GPUs herein, e.g., GPU 720, may receive a second frame, e.g., second frame 450, after a first frame, e.g., first frame 400, is received, where the first frame and the second frame may be associated with a plurality of frames. For instance, this process may be performed by step 502 in FIG. 5. The first frame, e.g., first frame 400, and the second frame, e.g., second frame 450, may be associated with at least one of augmented reality (AR), extended reality (XR), or virtual reality (VR) applications. Also, the plurality of frames associated with the first frame and the second frame may correspond to a video stream.

GPUs herein, e.g., GPU 720, may also compare at least one first region of the first frame, e.g., region 413, to at least one second region of the second frame, e.g., region 453.

GPUs herein, e.g., GPU 720, may also identify a discontinuity between at least one first region of a first frame, e.g., region 413, and at least one second region of a second frame, e.g., region 453, the at least one first region corresponding to the at least one second region, the first frame including a plurality of first regions, e.g., regions 411-418, and the second frame including a plurality of second regions, e.g., regions 451-458, the first frame and the second frame associated with a plurality of frames.

In some aspects, the discontinuity between the at least one first region, e.g., region 413, and the at least one second region, e.g., region 453, may correspond to non-contiguous content between the at least one first region and the at least one second region. Further, the discontinuity may be associated with a difference in at least one of content, brightness, or noise between the at least one first region, e.g., region 413, and the at least one second region, e.g., region 453. The discontinuity between the at least one first region, e.g., region 413, and the at least one second region, e.g., region 453, may also be associated with a plurality of motion vectors. Additionally, the discontinuity between the at least one first region, e.g., region 413, and the at least one second region, e.g., region 453, may be identified by a graphics processing unit (GPU), e.g., GPU 720.

GPUs herein, e.g., GPU 720, may also determine whether the discontinuity between the at least one first region, e.g., region 413, and the at least one second region, e.g., region 453, is greater than or equal to a motion estimation threshold. For instance, this process may be performed by step 608 in FIG. 6.

GPUs herein, e.g., GPU 720, may also skip a motion estimation for the at least one first region, e.g., region 413, and the at least one second region, e.g., region 453, when the discontinuity between the at least one first region and the at least one second region is greater than or equal to the motion estimation threshold. For instance, this process may be performed by step 524 in FIG. 5. In some instances, at least one of the skipped motion estimation or the identified discontinuity may be associated with at least one of a mask or masked motion estimation, such as at step 610 in FIG. 6.

Also, at least one of the skipped motion estimation or the identified discontinuity may be associated with at least one of an image pyramid, e.g., at steps 602 and 604 in FIG. 6, or an image hash function, e.g., at step 608 in FIG. 6.

GPUs herein, e.g., GPU 720, may also perform a motion estimation for the at least one first region, e.g., region 413, and the at least one second region, e.g., region 453, when the discontinuity between the at least one first region and the at least one second region is less than the motion estimation threshold. For instance, this process may be performed by step 522 in FIG. 5. In some aspects, the performed motion estimation may correspond to a plurality of motion vectors.

GPUs herein, e.g., GPU 720, may also configure a third frame based on the performed motion estimation, where the configured third frame may be associated with a frame extrapolation process, such as at step 612 in FIG. 6.

Figure 8:
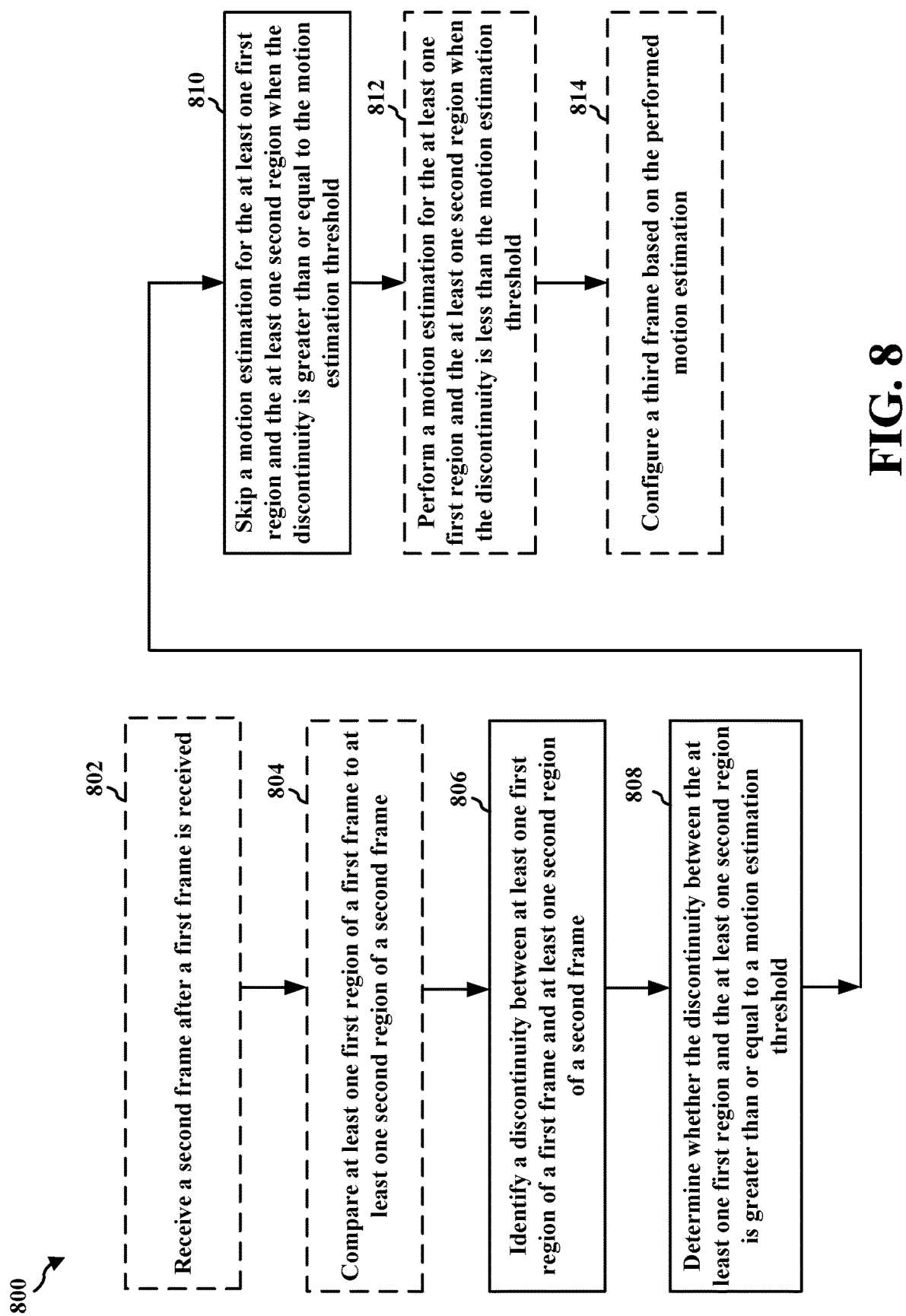
FIG. 8 illustrates an example flowchart of an example method in accordance with one or more techniques of this disclosure.

FIG. 8 illustrates a flowchart 800 of an example method in accordance with one or more techniques of this disclosure. The method may be performed by an apparatus such as a GPU, a CPU, an image processor, a frame processor, a display processing unit (DPU), or an apparatus for image, frame, or graphics processing.

At 802, the apparatus may receive a second frame after a first frame is received, where the first frame and the second frame may be associated with a plurality of frames, as described in connection with the examples in FIGS. 4A, 4B, 5, 6, and 7. The first frame and the second frame may be associated with at least one of augmented reality (AR), extended reality (XR), or virtual reality (VR) applications, as described in connection with the examples in FIGS. 4A, 4B, 5, 6, and 7. Also, the plurality of frames associated with the first frame and the second frame may correspond to a video stream, as described in connection with the examples in FIGS. 4A, 4B, 5, 6, and 7.

At 804, the apparatus may compare at least one first region of the first frame to at least one second region of the second frame, as described in connection with the examples in FIGS. 4A, 4B, 5, 6, and 7.

At 806, the apparatus may identify a discontinuity between at least one first region of a first frame and at least one second region of a second frame, the at least one first region corresponding to the at least one second region, the first frame including a plurality of first regions and the second frame including a plurality of second regions, the first frame and the second frame associated with a plurality of frames, as described in connection with the examples in FIGS. 4A, 4B, 5, 6, and 7.

In some aspects, the discontinuity between the at least one first region and the at least one second region may correspond to non-contiguous content between the at least one first region and the at least one second region, as described in connection with the examples in FIGS. 4A, 4B, 5, 6, and 7. Further, the discontinuity may be associated with a difference in at least one of content, brightness, or noise between the at least one first region and the at least one second region, as described in connection with the examples in FIGS. 4A, 4B, 5, 6, and 7. The discontinuity between the at least one first region and the at least one second region may also be associated with a plurality of motion vectors, as described in connection with the examples in FIGS. 4A, 4B, 5, 6, and 7. Additionally, the discontinuity between the at least one first region and the at least one second region may be identified by a graphics processing unit (GPU), as described in connection with the examples in FIGS. 4A, 4B, 5, 6, and 7.

At 808, the apparatus may determine whether the discontinuity between the at least one first region and the at least one second region is greater than or equal to a motion estimation threshold, as described in connection with the examples in FIGS. 4A, 4B, 5, 6, and 7.

At 810, the apparatus may skip a motion estimation for the at least one first region and the at least one second region when the discontinuity between the at least one first region and the at least one second region is greater than or equal to the motion estimation threshold, as described in connection with the examples in FIGS. 4A, 4B, 5, 6, and 7. In some instances, at least one of the skipped motion estimation or the identified discontinuity may be associated with at least one of a mask or masked motion estimation, as described in connection with the examples in FIGS. 4A, 4B, 5, 6, and 7. Also, at least one of the skipped motion estimation or the identified discontinuity may be associated with at least one of an image pyramid or an image hash function, as described in connection with the examples in FIGS. 4A, 4B, 5, 6, and 7.

At 812, the apparatus may perform a motion estimation for the at least one first region and the at least one second region when the discontinuity between the at least one first region and the at least one second region is less than the motion estimation threshold, as described in connection with the examples in FIGS. 4A, 4B, 5, 6, and 7. In some aspects, the performed motion estimation may correspond to a plurality of motion vectors, as described in connection with the examples in FIGS. 4A, 4B, 5, 6, and 7.

At 814, the apparatus may configure a third frame based on the performed motion estimation, where the configured third frame may be associated with a frame extrapolation process, as described in connection with the examples in FIGS. 4A, 4B, 5, 6, and 7.

In one configuration, a method or apparatus for image, frame, or graphics processing is provided. The apparatus may be a GPU, a CPU, an image processor, a frame processor, a display processing unit (DPU), or some other processor that can perform image, frame, or graphics processing. In one aspect, the apparatus may be the processing unit 120 within the device 104, or may be some other hardware within device 104 or another device. The apparatus may include means for identifying a discontinuity between at least one first region of a first frame and at least one second region of a second frame, the at least one first region corresponding to the at least one second region, the first frame including a plurality of first regions and the second frame including a plurality of second regions, the first frame and the second frame associated with a plurality of frames. The apparatus may also include means for determining whether the discontinuity between the at least one first region and the at least one second region is greater than or equal to a motion estimation threshold. The apparatus may also include means for skipping a motion estimation for the at least one first region and the at least one second region when the discontinuity between the at least one first region and the at least one second region is greater than or equal to the motion estimation threshold. The apparatus may also include means for performing a motion estimation for the at least one first region and the at least one second region when the discontinuity between the at least one first region and the at least one second region is less than the motion estimation threshold. The apparatus may also include means for configuring a third frame based on the performed motion estimation, where the configured third frame is associated with a frame extrapolation process. The apparatus may also include means for receiving the second frame after the first frame is received. The apparatus may also include means for comparing the at least one first region of the first frame to the at least one second region of the second frame.

The subject matter described herein can be implemented to realize one or more benefits or advantages. For instance, the described image, frame, or graphics processing techniques can be used by a GPU, a CPU, an image processor, a frame processor, a display processing unit (DPU), or some other processor that can perform image, frame, or graphics processing to implement the skipping motion estimation techniques described herein. This can also be accomplished at a low cost compared to other image, frame, or graphics processing techniques. Moreover, the image, frame, or graphics processing techniques herein can improve or speed up frame processing or execution. Further, the image, frame, or graphics processing techniques herein can improve resource or data utilisation and/or resource efficiency. Additionally, aspects of the present disclosure can utilize skipping motion estimation techniques in order to increase accuracy, save power, improve processing time, reduce latency, and/or reduce performance overhead.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

The following aspects are illustrative only and may be combined with other aspects or teachings described herein, without limitation.

Aspect 1 is a method of image processing. The method includes identifying a discontinuity between at least one first region of a first frame and at least one second region of a second frame, the at least one first region corresponding to the at least one second region, the first frame including a plurality of first regions and the second frame including a plurality of second regions, the first frame and the second frame associated with a plurality of frames; determining whether the discontinuity between the at least one first region and the at least one second region is greater than or equal to a motion estimation threshold; and skipping a motion estimation for the at least one first region and the at least one second region when the discontinuity between the at least one first region and the at least one second region is greater than or equal to the motion estimation threshold.

Aspect 2 is the method of aspect 1, where the discontinuity between the at least one first region and the at least one second region corresponds to non-contiguous content between the at least one first region and the at least one second region.

Aspect 3 is the method of any of aspects 1 and 2, where the discontinuity is associated with a difference in at least one of content, brightness, or noise between the at least one first region and the at least one second region.

Aspect 4 is the method of any of aspects 1 to 3, where at least one of the skipped motion estimation or the identified discontinuity is associated with at least one of a mask or masked motion estimation.

Aspect 5 is the method of any of aspects 1 to 4, where at least one of the skipped motion estimation or the identified discontinuity is associated with at least one of an image pyramid or an image hash function.

Aspect 6 is the method of any of aspects 1 to 5, further comprising performing a motion estimation for the at least one first region and the at least one second region when the discontinuity between the at least one first region and the at least one second region is less than the motion estimation threshold.

Aspect 7 is the method of any of aspects 1 to 6, further comprising configuring a third frame based on the performed motion estimation, where the configured third frame is associated with a frame extrapolation process.

Aspect 8 is the method of any of aspects 1 to 7, where the performed motion estimation corresponds to a plurality of motion vectors.

Aspect 9 is the method of any of aspects 1 to 8, further comprising receiving the second frame after the first frame is received.

Aspect 10 is the method of any of aspects 1 to 9, further comprising comparing the at least one first region of the first frame to the at least one second region of the second frame.

Aspect 11 is the method of any of aspects 1 to 10, where the discontinuity between the at least one first region and the at least one second region is associated with a plurality of motion vectors.

Aspect 12 is the method of any of aspects 1 to 11, where the first frame and the second frame are associated with at least one of augmented reality (AR), extended reality (XR), or virtual reality (VR) applications.

Aspect 13 is the method of any of aspects 1 to 12, where the discontinuity between the at least one first region and the at least one second region is identified by a graphic s processing unit (GPU).

Aspect 14 is the method of any of aspects 1 to 13, where the plurality of frames associated with the first frame and the second frame corresponds to a video stream.

Aspect 15 is an apparatus for image processing including means for implementing a method as in any of aspects 1 to 14.

Aspect 16 is an apparatus for image processing including at least one processor coupled to a memory and configured to implement a method as in any of aspects 1 to 14.

Aspect 17 is a computer-readable medium storing computer executable code, where the code when executed by a processor causes the processor to implement a method as in any of aspects 1 to 14.

What is claimed is:

1. A method of image processing, comprising:
   identifying a discontinuity between at least one first region of a first frame and at least one second region of a second frame, the at least one first region corresponding to the at least one second region, the first frame including a plurality of first regions and the second frame including a plurality of second regions, the first frame and the second frame associated with a plurality of frames;
   determining whether the discontinuity between the at least one first region and the at least one second region is greater than or equal to a motion estimation threshold; and
   skipping a motion estimation for the at least one first region and the at least one second region when the discontinuity between the at least one first region and the at least one second region is greater than or equal to the motion estimation threshold.

2. The method of claim 1, wherein the discontinuity between the at least one first region and the at least one second region corresponds to non-contiguous content between the at least one first region and the at least one second region.

3. The method of claim 1, wherein the discontinuity is associated with a difference in at least one of content, brightness, or noise between the at least one first region and the at least one second region.

4. The method of claim 1, wherein at least one of the skipped motion estimation or the identified discontinuity is associated with at least one of a mask or masked motion estimation.

5. The method of claim 1, wherein at least one of the skipped motion estimation or the identified discontinuity is associated with at least one of an image pyramid or an image hash function.

6. The method of claim 1, further comprising:
performing a motion estimation for the at least one first region and the at least one second region when the discontinuity between the at least one first region and the at least one second region is less than the motion estimation threshold.

7. The method of claim 6, further comprising:
configuring a third frame based on the performed motion estimation, wherein the configured third frame is associated with a frame extrapolation process.

8. The method of claim 6, wherein the performed motion estimation corresponds to a plurality of motion vectors.

9. The method of claim 1, further comprising:
receiving the second frame after the first frame is received.

10. The method of claim 1, further comprising:
comparing the at least one first region of the first frame to the at least one second region of the second frame.

11. The method of claim 1, wherein the discontinuity between the at least one first region and the at least one second region is associated with a plurality of motion vectors.

12. The method of claim 1, wherein the first frame and the second frame are associated with at least one of augmented reality (AR), extended reality (XR), or virtual reality (VR) applications.

13. The method of claim 1, wherein the discontinuity between the at least one first region and the at least one second region is identified by a graphics processing unit (GPU).

14. The method of claim 1, wherein the plurality of frames associated with the first frame and the second frame corresponds to a video stream.

15. An apparatus for image processing, comprising:
a memory; and
at least one processor coupled to the memory and configured to:
identify a discontinuity between at least one first region of a first frame and at least one second region of a second frame, the at least one first region corresponding to the at least one second region, the first frame including a plurality of first regions and the second frame including a plurality of second regions, the first frame and the second frame associated with a plurality of frames;
determine whether the discontinuity between the at least one first region and the at least one second region is greater than or equal to a motion estimation threshold; and
skip a motion estimation for the at least one first region and the at least one second region when the discontinuity between the at least one first region and the at least one second region is greater than or equal to the motion estimation threshold.

16. The apparatus of claim 15, wherein the discontinuity between the at least one first region and the at least one second region corresponds to non-contiguous content between the at least one first region and the at least one second region.

17. The apparatus of claim 15, wherein the discontinuity is associated with a difference in at least one of content, brightness, or noise between the at least one first region and the at least one second region.

18. The apparatus of claim 15, wherein at least one of the skipped motion estimation or the identified discontinuity is associated with at least one of a mask or masked motion estimation.

19. The apparatus of claim 15, wherein at least one of the skipped motion estimation or the identified discontinuity is associated with at least one of an image pyramid or an image hash function.

20. The apparatus of claim 15, wherein the at least one processor is further configured to:
perform a motion estimation for the at least one first region and the at least one second region when the discontinuity between the at least one first region and the at least one second region is less than the motion estimation threshold.

21. The apparatus of claim 20, wherein the at least one processor is further configured to:
configure a third frame based on the performed motion estimation, wherein the configured third frame is associated with a frame extrapolation process.

22. The apparatus of claim 20, wherein the performed motion estimation corresponds to a plurality of motion vectors.

23. The apparatus of claim 15, wherein the at least one processor is further configured to:
receive the second frame after the first frame is received.

24. The apparatus of claim 15, wherein the at least one processor is further configured to:
compare the at least one first region of the first frame to the at least one second region of the second frame.

25. The apparatus of claim 15, wherein the discontinuity between the at least one first region and the at least one second region is associated with a plurality of motion vectors.

26. The apparatus of claim 15, wherein the first frame and the second frame are associated with at least one of augmented reality (AR), extended reality (XR), or virtual reality (VR) applications.

27. The apparatus of claim 15, wherein the discontinuity between the at least one first region and the at least one second region is identified by a graphics processing unit (GPU).

28. The apparatus of claim 15, wherein the plurality of frames associated with the first frame and the second frame corresponds to a video stream.

29. An apparatus for image processing, comprising:
means for identifying a discontinuity between at least one first region of a first frame and at least one second region of a second frame, the at least one first region corresponding to the at least one second region, the first frame including a plurality of first regions and the second frame including a plurality of second regions, the first frame and the second frame associated with a plurality of frames;
means for determining whether the discontinuity between the at least one first region and the at least one second region is greater than or equal to a motion estimation threshold; and
means for skipping a motion estimation for the at least one first region and the at least one second region when the discontinuity between the at least one first region and the at least one second region is greater than or equal to the motion estimation threshold.

30. The apparatus of claim 29, wherein the discontinuity between the at least one first region and the at least one second region corresponds to non-contiguous content between the at least one first region and the at least one second region.

31. The apparatus of claim 29, wherein the discontinuity is associated with a difference in at least one of content, brightness, or noise between the at least one first region and the at least one second region.

32. The apparatus of claim 29, wherein at least one of the skipped motion estimation or the identified discontinuity is associated with at least one of a mask or masked motion estimation.

33. The apparatus of claim 29, wherein at least one of the skipped motion estimation or the identified discontinuity is associated with at least one of an image pyramid or an image hash function.

34. The apparatus of claim 29, further comprising:
means for performing a motion estimation for the at least one first region and the at least one second region when the discontinuity between the at least one first region and the at least one second region is less than the motion estimation threshold.

35. The apparatus of claim 34, further comprising:
means for configuring a third frame based on the performed motion estimation, wherein the configured third frame is associated with a frame extrapolation process.

36. The apparatus of claim 34, wherein the performed motion estimation corresponds to a plurality of motion vectors.

37. The apparatus of claim 29, further comprising:
means for receiving the second frame after the first frame is received.

38. The apparatus of claim 29, further comprising:
means for comparing the at least one first region of the first frame to the at least one second region of the second frame.

39. The apparatus of claim 29, wherein the discontinuity between the at least one first region and the at least one second region is associated with a plurality of motion vectors.

40. The apparatus of claim 29, wherein the first frame and the second frame are associated with at least one of augmented reality (AR), extended reality (XR), or virtual reality (VR) applications.

41. The apparatus of claim 29, wherein the discontinuity between the at least one first region and the at least one second region is identified by a graphics processing unit (GPU).

42. The apparatus of claim 29, wherein the plurality of frames associated with the first frame and the second frame corresponds to a video stream.

43. A non-transitory computer readable medium storing computer executable code for image processing, the code when executed by a processor causes the processor to:
identify a discontinuity between at least one first region of a first frame and at least one second region of a second frame, the at least one first region corresponding to the at least one second region, the first frame including a plurality of first regions and the second frame including a plurality of second regions, the first frame and the second frame associated with a plurality of frames;
determine whether the discontinuity between the at least one first region and the at least one second region is greater than or equal to a motion estimation threshold; and
skip a motion estimation for the at least one first region and the at least one second region when the discontinuity between the at least one first region and the at least one second region is greater than or equal to the motion estimation threshold.

\* \* \* \* \*